US00RE43235E

(19) United States
(12) Reissued Patent
Ishii et al.

(10) Patent Number: US RE43,235 E
(45) Date of Reissued Patent: Mar. 13, 2012

(54) SINGLE-BLOCK VIRTUAL FRAME BUFFER TRANSLATED TO MULTIPLE PHYSICAL BLOCKS FOR MULTI-BLOCK DISPLAY REFRESH GENERATOR

(75) Inventors: Takatoshi Ishii, Sunnyvale, CA (US); Edmund Cheung, Palo Alto, CA (US); Sherwood Brannon, Sebastian, FL (US)

(73) Assignee: Faust Communications, LLC, Las Vegas, NV (US)

(21) Appl. No.: 12/789,856

(22) Filed: May 28, 2010

Related U.S. Patent Documents

Reissue of:
(64) Patent No.: 6,680,738
Issued: Jan. 20, 2004
Appl. No.: 09/683,852
Filed: Feb. 22, 2002

U.S. Applications:
(62) Division of application No. 11/337,221, filed on Jan. 20, 2006, now Pat. No. Re. 41,967.

(51) Int. Cl.

| | |
|---|---|
| ***G06F 12/10*** | (2006.01) |
| ***G06F 12/06*** | (2006.01) |
| ***G09G 3/37*** | (2006.01) |
| ***G09G 5/00*** | (2006.01) |
| ***G09G 5/36*** | (2006.01) |

(52) U.S. Cl. ..... 345/568; 345/545; 345/562; 345/572; 345/656

(58) Field of Classification Search ..... 345/568, 345/572, 565, 537, 538, 562; 711/202–209
See application file for complete search history.

(56) References Cited

U.S. PATENT DOCUMENTS

| | | | |
|---|---|---|---|
| 4,404,552 | A | 9/1983 | Hirahata et al. |
| 4,845,662 | A | 7/1989 | Tokumitsu |
| 4,882,683 | A | 11/1989 | Rupp et al. |
| 4,985,848 | A | 1/1991 | Pfeiffer et al. |
| 5,062,057 | A | 10/1991 | Blacken et al. |

(Continued)

OTHER PUBLICATIONS

Official Action in U.S. Appl. No. 11/337,221 dated May 22, 2008, 11 pages.

(Continued)

*Primary Examiner* — Hau Nguyen

(57) ABSTRACT

A graphics controller for a System-On-a-Chip (SOC) used with a battery-powered device allows for reduced-power display modes. The microprocessor writes to a frame buffer that is a single, contiguous address block in virtual memory. A memory management unit (MMU) translates frame-buffer address to multiple physical blocks. The graphics controller fetches pixels from the multiple physical blocks, including a block in an on-chip memory and a block in an external memory. In a low-power mode, pixels are only fetched from the lower-power on-chip memory and not the higher-power external memory. A smaller display window is defined and pixels outside the window are replaced by dummy data, .eliminating external-memory fetches. The smaller display window falls within the first block in the on-chip memory. Status and other information can be displayed in the smaller display window during stand-by modes, while a full-screen of data is displayed for full-power modes.

19 Claims, 6 Drawing Sheets

U.S. PATENT DOCUMENTS

| | | | | |
|---|---|---|---|---|
| 5,063,526 | A | | 11/1991 | Kagawa et al. |
| 5,091,721 | A | | 2/1992 | Hamori |
| 5,119,494 | A | | 6/1992 | Garman |
| 5,129,060 | A | | 7/1992 | Pfeiffer et al. |
| 5,249,267 | A | | 9/1993 | Osaki |
| 5,280,579 | A | | 1/1994 | Nye |
| 5,311,213 | A | | 5/1994 | Kosugi |
| 5,353,403 | A | | 10/1994 | Kohiyama et al. |
| 5,408,251 | A | | 4/1995 | Kwon |
| 5,422,997 | A | | 6/1995 | Nagashima |
| 5,473,348 | A | | 12/1995 | Fujimoto |
| 5,487,146 | A | | 1/1996 | Guttag et al. |
| 5,526,025 | A | | 6/1996 | Selwan et al. |
| 5,696,528 | A | * | 12/1997 | Yun ..... 345/420 |
| 5,712,664 | A | | 1/1998 | Reddy |
| 5,712,999 | A | | 1/1998 | Guttag et al. |
| 5,794,016 | A | | 8/1998 | Kelleher |
| 5,818,417 | A | | 10/1998 | Mattison |
| 5,860,016 | A | | 1/1999 | Nookala et al. |
| 5,943,066 | A | | 8/1999 | Thomas et al. |
| 5,945,974 | A | | 8/1999 | Sharma et al. |
| 5,966,116 | A | | 10/1999 | Wakeland |
| 6,101,620 | A | | 8/2000 | Ranganathan |
| 6,125,431 | A | | 9/2000 | Kobayashi |
| 6,205,531 | B1 | | 3/2001 | Hussain |
| 6,308,248 | B1 | | 10/2001 | Welker et al. |
| 6,417,857 | B2 | | 7/2002 | Finger et al. |

OTHER PUBLICATIONS

Response to Official Action in U.S. Appl. No. 11/337,221 dated May 22, 2008, mailed Jul. 28, 2008, 14 pages.

Official Action in U.S. Appl. No. 11/337,221 dated Oct. 28, 2008, 13 pages.

Preliminary Amendment accompanying Request for Continued Examination in U.S. Appl. No. 11/337,221 dated Jan. 26, 2009, 8 pages.

Official Action in U.S. Appl. No. 11/337,221 dated Jan. 25, 2010, 5 pages.

Response to Official Action in U.S. Appl. No. 11/337,221 dated Oct. 28, 2008, mailed Apr. 26, 2010, 2 pages.

Notice of Allowability U.S. Appl. No. 11/337,221 dated Jul. 7, 2010, 6 pages.

* cited by examiner

FULL-POWER MODE

LOW-POWER MODE

SINGLE-BLOCK VIRTUAL FRAME BUFFER TRANSLATED TO MULTIPLE PHYSICAL BLOCKS FOR MULTI-BLOCK DISPLAY REFRESH GENERATOR

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,680,738. The reissue applications are application Ser. No. 11/337,221 ("the '221 application"), filed Jan. 20, 2006, and the present application, which is a divisional of the '221 application, filed herewith.*

BACKGROUND OF INVENTION

This invention relates to computer-graphics systems, and more particularly to frame buffers split among multiple blocks in memory.

An interesting variety of small consumer devices are appearing. Portable computing and/or communication devices such as the personal digital assistant (PDA), Pocket PC, and smart cellular phones have an astonishing computing power for such small devices. These portable, often hand-held, computing devices often use a very-large-scale-integration (VLSI) chip that includes a microprocessor or central processing unit (CPU), memory, and I/O controllers on a single silicon chip known as a System-On-a-Chip (SOC).

These consumer devices run on battery power to achieve portability. The battery must be made small and light to keep the size and weight of the overall device small. Such small batteries necessitate the use of low-power chips including the SOC.

The SOC can include an on-chip static random-access memory (SRAM). Program running on the SOC's CPU can access data from an on-chip read-only-memory (ROM) and write data to the on-chip SRAM. Using the on-chip SRAM reduces power, since this avoids access cycles to an external dynamic-random-access memory (DRAM) that require more power to drive the larger off-chip capacitances.

Some accesses of the external DRAM may still be needed to load a very large program into the SRAM, or to fetch very large data files. Once these are stored and fetched, the external DRAM can be powered down while the program and frame buffer are located and executed within the on-chip SRAM. Use of the on-chip SRAM also improves performance, as SRAM access times are faster than access times to the external DRAM.

The SOC may include a graphics controller that continuously reads pixel data from a frame buffer and sends these pixels off-chip from the SOC to a display. The display can be a small liquid crystal display (LCD) that requires little power, or other compact display. The frame buffer can be a portion of the on-chip SRAM that is written by the CPU when updating the display. Using the internal SRAM for the frame buffer can further save power, since external accesses of an external frame-buffer memory are avoided.

However, larger, more colorful displays running at higher-resolution modes may require a large frame buffer to store a large number of pixels. Higher-color modes require more storage bits per pixel, and higher resolutions have more pixels to store. The on-chip SRAM may need to be enlarged to provide sufficient capacity for these larger frame buffers.

However, larger on-chip SRAMs increase the SOC die size and reduce manufacturing yield. The SOC may even become too expensive for many low-cost consumer devices.

For example, a display of 320×240 pixels having one byte per pixel requires 76,000 bytes, which fits in a 100 Kilo-Byte (KB) SRAM. However, a more colorful display using 16 bits per pixel requires about 150 KB, which is larger than the 100 KB SRAM.

The frame buffer could be split among the on-chip SRAM and the external DRAM. However, all software programs running on the CPU expect the frame buffer to be a single, continuous block of address. Re-writing the many programs that can run on the CPU to allow for a split frame buffer is not practical. Programs are written expecting a conventional frame buffer with a contiguous block of addresses.

What is desired is a SOC that supports a frame buffer that can be split among multiple blocks of memory in the internal SRAM and the external DRAM. A graphics controller that can re-assemble pixels from the multiple blocks is desirable. A SOC that has a high-power display mode that splits the frame buffer between the on-chip SRAM and the external DRAM, and with a low-power display mode that only uses the on-chip SRAM is desired. It is further desired that the frame buffer appear to be a single, contiguous block of memory to programs executing on the CPU.

DETAILED DESCRIPTION

The present invention relates to an improvement in frame buffers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
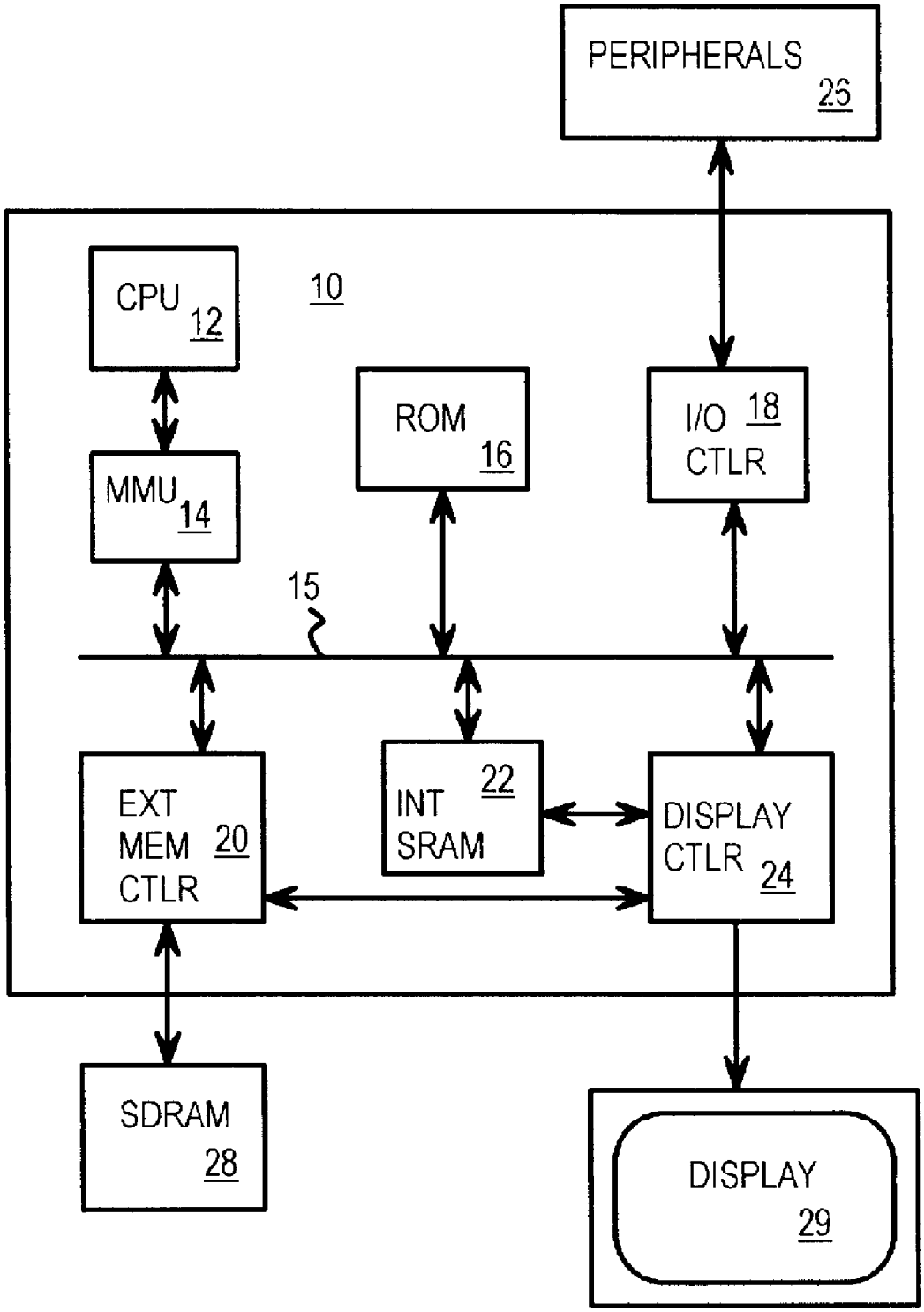
FIG. 1 is a block diagram of a System-On-a-Chip (SOC) with a multi-block frame buffer.

FIG. 1 is a block diagram of a System-On-a-Chip (SOC) with a multi-block frame buffer. SOC 10 is a single-chip system that communicates with external peripherals 26 and display 29. CPU 12 executes program instructions from ROM. 16 or from internal on-chip SRAM 22, or from external synchronous DRAM (SDRAM) 28 through external memory controller 20. Memory management unit (MMU) 14 translates logical addresses from CPU 10 into physical addresses. MMU 14 can perform memory-page swapping and other functions.

Peripherals 26 can include a keypad or pointing device that inputs commands or selections from a user. Peripherals 26 can include other devices, such as a speaker, light-emitting diode lights, cable connectors, etc. I/O controller 18 has registers that can be read and written by CPU 12 over internal bus 15 to communicate with and control peripherals 26. Timers, direct-memory access (DMA), or other I/O controller functions may be included in I/O controller 18.

Graphics display controller 24 drives a stream of pixels to external display 29 to refresh the display. These pixels are fetched from a frame buffer in on-chip SRAM 22 for low-power display modes when the entire frame buffer fits inside SRAM 22. However, for higher-resolution, higher-color, higher-power display modes the frame buffer does not completely fit in SRAM 22. Instead, the frame buffer is divided among two or more blocks. At least one block is in SRAM 22, but one or more other blocks are located in external SDRAM 28.

Graphics display controller 24 contains address-generation and boundary-checking logic to fetch some pixels from SRAM 22, while other pixels are fetched from SDRAM 28 using external memory controller 20.

Programs running on CPU 12 update the display by writing pixels to a single-block frame buffer in the logical address space. MMU 14 translates these memory accesses from CPU 12 into the physical addresses of multiple blocks in SRAM 22 and SDRAM 28. Thus programs see a frame buffer with a single memory block, but graphics display controller 24 sees a frame buffer with multiple memory blocks.

Figure 2:
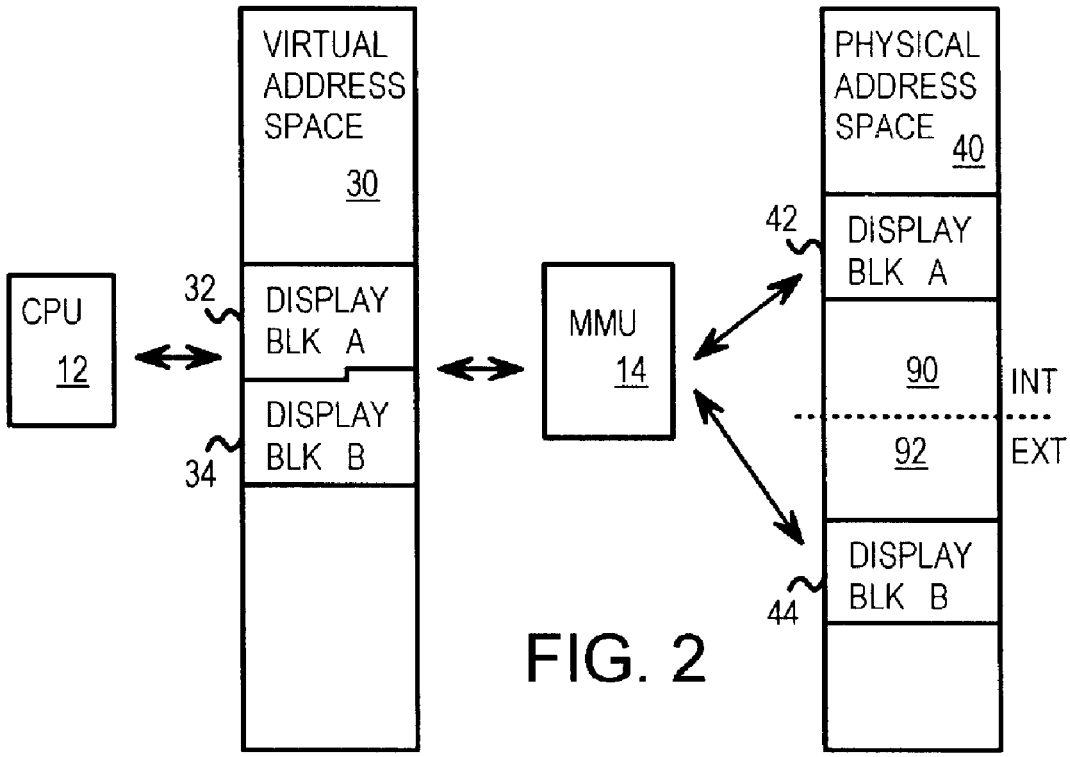
FIG. 2 is a memory-map diagram showing CPU writes to the frame buffer.

FIG. 2 is a memory-map diagram showing CPU writes to the frame buffer. Programs running on CPU 12 update the display by over-writing pixels in the frame buffer. These programs write pixels using virtual address within virtual address space 30. The frame buffer is a continuous block of virtual address that include virtual blocks 32, 34. The starting address and size of the frame buffer are set by the application program or operating system depending on the current graphics mode.

Memory writes from CPU 12 are sent to MMU 14 before actually being written to the frame-buffer memory. MMU 14 translates the virtual address from CPU 12 into a physical address for the memory. The physical address is within physical address space 40, which includes both on-chip addresses 90 in the on-chip SRAM, and external addresses 92 in the external SDRAM.

The frame buffer is split among two blocks in this example. Display block A is virtual block 32 in virtual address space 30, but physical block 42 in physical address space 40. Pixels to block 32 are translated by MMU to addresses within block 42 so that the pixels are written to on-chip SRAM.

Display block B is virtual block 34 in virtual address space 30, but physical block 44 in physical address space 40. Pixels to block 34 are translated by the MMU to addresses within block 44 so that the pixels are written to the external SDRAM. Thus although blocks 32, 34 are continuous in virtual address space 30 accessed by programs, pixels are stored in separate physical blocks 42, 44 in different physical memory devices.

Figure 3:
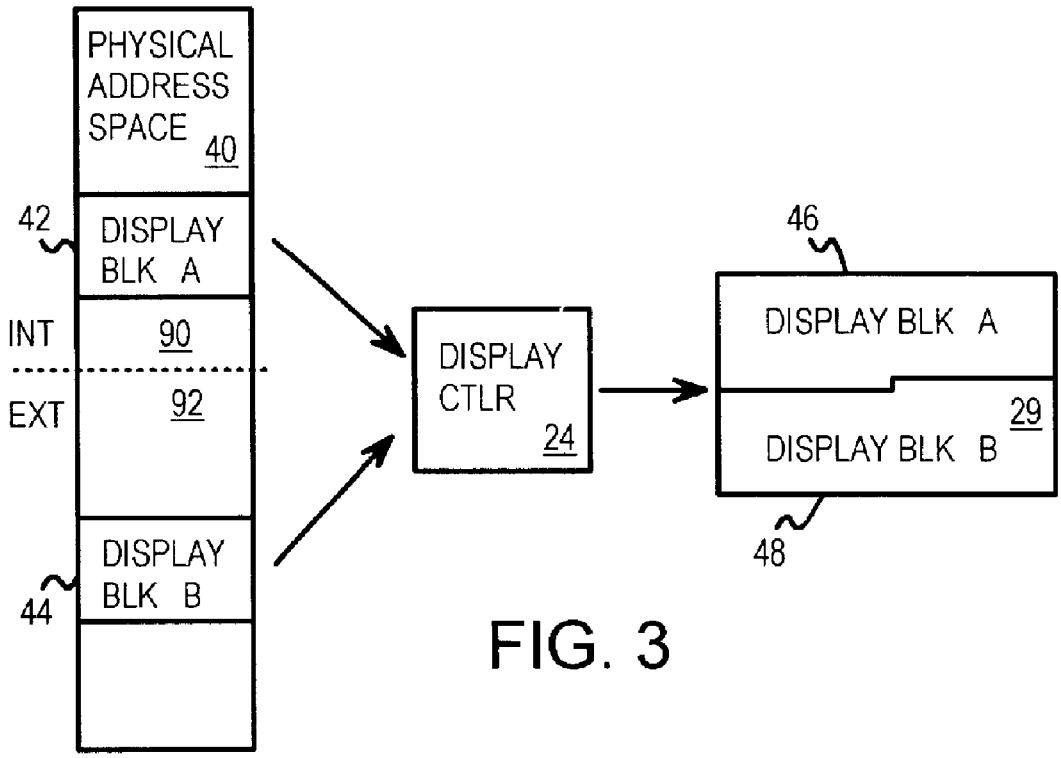
FIG. 3 is a memory-map diagram showing display-refresh fetches from the multi-block frame buffer.

FIG. 3 is a memory-map diagram showing display-refresh fetches from the multi-block frame buffer. Pixels are stored in multiple physical blocks 42, 44 in physical address space 40.

Graphics display controller 24 reads pixels from physical block 42 with internal addresses for the on-chip SRAM. These pixels are displayed as display block 46 on display 29. Graphics display controller 24 also reads pixels from physical block 44 with external addresses for the external SDRAM. These pixels are displayed as display block 48 on display 29. Thus Graphics display controller 24 reads separate physical-memory blocks and combines them into a single frame of display.

Figure 4:
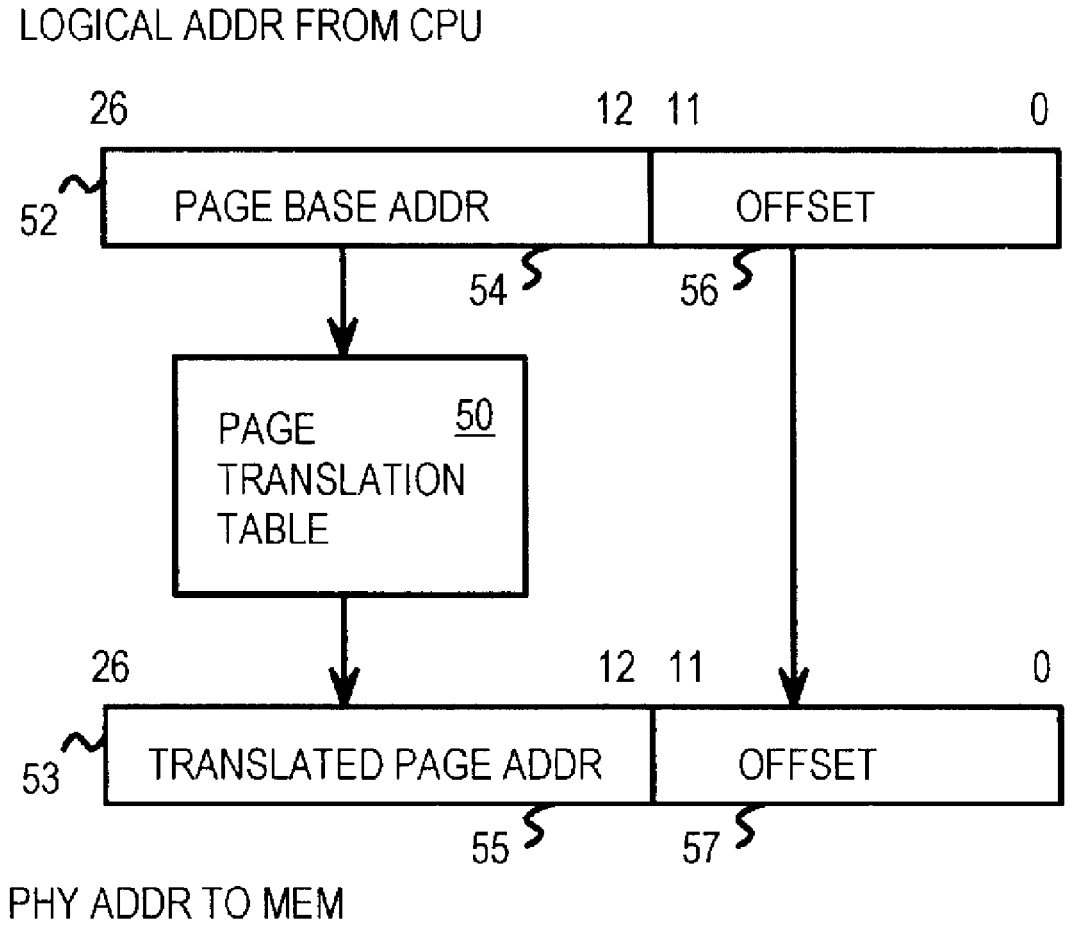
FIG. 4 shows page translation.

FIG. 4 shows page translation. The MMU contains one or more page-translation table 50. Table 50 contains translation entries such as logical, physical address pairs. Recently-used entries can be cached from a larger, more complete table.

Logical address 52 is generated by the CPU and contains a least-significant-bits (LSB) portion known as offset 56. The most-significant-bits (MSB) portion of logical address 52 is page base address 54, or simply the page address.

Page base address 54 of logical address 52 is used to lookup an entry in translation table 50. The entry for page base address 54 contains a translated page address, which is output from table 50 as translated page address 55.

Physical address 53 is formed by concatenating translated page address 55 with offset 56 from logical address 52, which is unchanged as offset 57. Offset 56, 57 can be considered the address within a page that is identified by page base address 54 in the logical address space, or translated page address 55 in the physical address space. In this example, offsets 56, 57 are 12 bits, for a page size of 4 KB.

Figure 5:
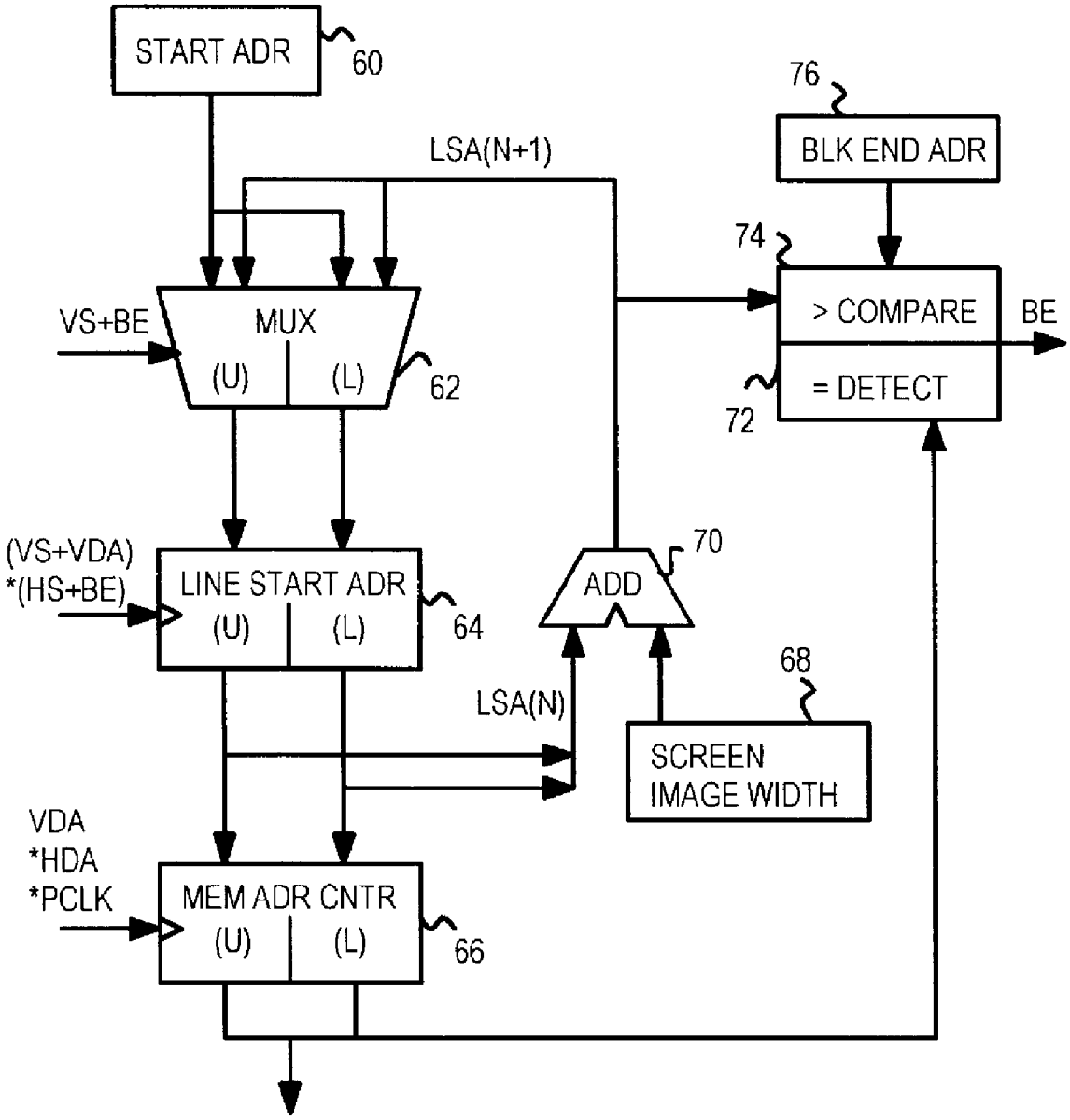
FIG. 5 is a diagram of refresh address generation for fetching frame-buffer pixels from multiple physical blocks.

FIG. 5 is a diagram of refresh address generation for fetching frame-buffer pixels from multiple physical blocks. Start address selector 60 selects the screen starting address, or the block start address. The screen starting address is the address location of the first pixel on the screen, usually the upper-left pixel of the top line. The block start address is the address of the first pixel in the next physical block of the display frame buffer. A hardware selector can be used to select the proper start address for start address selector 60, or a program or firmware can load the proper start address at the desired time.

Just before the start of a new screen, VS is activated, and the screen starting address from selector 60 is fed through mux 62 to line start register 64. Otherwise, mux 62 selects the next line starting address, LSA(n+1), when the vertical sync VS is not active. This allows the address for the next horizontal line of pixels to be generated.

The new screen address (SSA) selected by mux 62 can be loaded into line start register 64 when both HS and VS are active. Then, after the end of the horizontal sync (HS), the screen start address (SSA) in the line start register 64 is latched into memory address counter 66 at the end of the horizontal sync.

Memory address counter 66 is incremented by the pixel size for each pixel clock PCLK during the display time, when both horizontal display active HDA and vertical display active VDA are on. Memory address counter 66 is loaded with the line start address from line start register 64 before the beginning of each line towards the end of the HS timing after line start register 64 is loaded with a new value at the beginning of HS. Memory address counter 66 contains a physical address that is sent the physical memory to fetch the next pixel. The physical address is in the on-chip SRAM for the first block, but can be in the external SDRAM for other blocks of the frame buffer.

Adder 70 generates the next line's starting address, LSA (n+1), by adding the current line start address from line start register 64 to the screen-image width SIW from screen-width register 68. Screen-width register 68 contains the width of the screen, which is the number of pixels in the displayed line plus the number of pixels in the off-screen (non-displayed) part of the line, multiplied by the pixel width in bytes (or other addressable units of the physical memory). This next-line starting address is selected by mux 62 to be loaded into line start register 64 at the beginning of the next HS.

The physical address of the current pixel from memory address counter 66 is compared by detector 72 to the block end address BEA in register 76. When the current pixel's address matches the block end address, the end of the block has been reached. The next pixel must be fetched from a different physical block, which may not be contiguous with the current block.

Sometimes the block end may occur at the end of a line of pixels, or between the address at the end of a line and the next line's start address, rather than in the middle of the line. Then the block end is not detected by detector 72. Instead, comparator 74 detects that the next line's starting address (which is generated by adder 70) is greater than the block end address from BEA register 76.

When the end of the block is detected by either detector 72 (block ends in the middle of a line) or comparator 74 (block ends at end of line), block end signal BE is activated. The next-line address from adder 70 is no good as it over-runs or exceeds the end of the block. Instead, the start address of the next block is used. This block start address (BSA) is selected to be output from start address selector 60 prior to the end of the current block. Mux 62 selects the new block's start address from start address selector 60 when BE is activated. The new block start address is latched into line start register 64 by the BE signal during the vertical display active time VDA.

Memory address counter 66 is loaded with the new block start address from line start register 64. The next pixel in the line is fetched from the new physical memory block at this block starting address. Memory address counter 66 then continues to count up with the pixel clock, reading pixels from the new physical block. Adder 70 generates the next line's starting address, LSA(n+1) from the block's starting address in line start register 64. At the end of the line, when HS is activated, this new line's address is latched into line start register 64 through mux 62, and pixel fetching continues with the second display line in the new physical block.

The screen starting address in start address selector 60 is a full-width address. The full address can be loaded into both the upper (U) and lower (L) portions of line start register 64 and memory address counter 66 as described above. This allows the physical blocks to have an arbitrary length. However, the block start address uses a fixed block size, such as fixed-size pages. For example, the page size (length) is often set to 4K bytes, where the lower 12 address bits are the offset within the page. Then the page's (block's) starting address can be specified by just the upper m−12 address bits, where m is the address width in bits. For example, a 32-bit address can use just the upper 20 bits as the page starting address, since it is assumed that the lower address bits are all zero's for the first address in the page.

Using such fixed-length physical-memory blocks, or pages, is advantageous because smaller-width registers and logic paths can be used. Lower address bits can be quickly zeroed out when a new physical block is started. When a new block address is loaded from start address selector 60 through mux 62 to line start register 64, the upper bits are loaded from start address selector 60 by mux 62 into the upper portion of line start register 64. The lower bits are zeroed by mux 62 and loaded as zeros into the lower portion of line start register 64. Likewise, the lower portion of memory address counter 66 can become zero at the start of a new block, and just the upper bits loaded from line start register 64. If the block end occurs between the end of a line and the next start address, the lower portion of memory address counter 66 can be loaded from output of the adder 70 through mux 62 and line start register 64. This is not the start of a new block, so just the upper bits loaded from line start register 64.

Since all physical addresses within a block have the same upper address bits, the upper portions of line start register 64 and memory address counter 66 can continue to be loaded from start address selector 60 for each new line, if the next line start address is in the same block. Alternately, the upper portions can be loaded just once at the start of the block, and not re-loaded when the lower-portions are loaded for each new display line.

An overflow or carry-out signal from the lower portion of memory address counter 66 is an input to detector 72. If the block end address register 76 and upper portion of memory address counter 66 are equal, then the BE signal become active. Adder 70 outputs the next line's start memory address which is input to comparator 74 to compare with block end address register 76 to signal the block end BE when the next line's start address is greater than block end address register 76.

Figure 6:
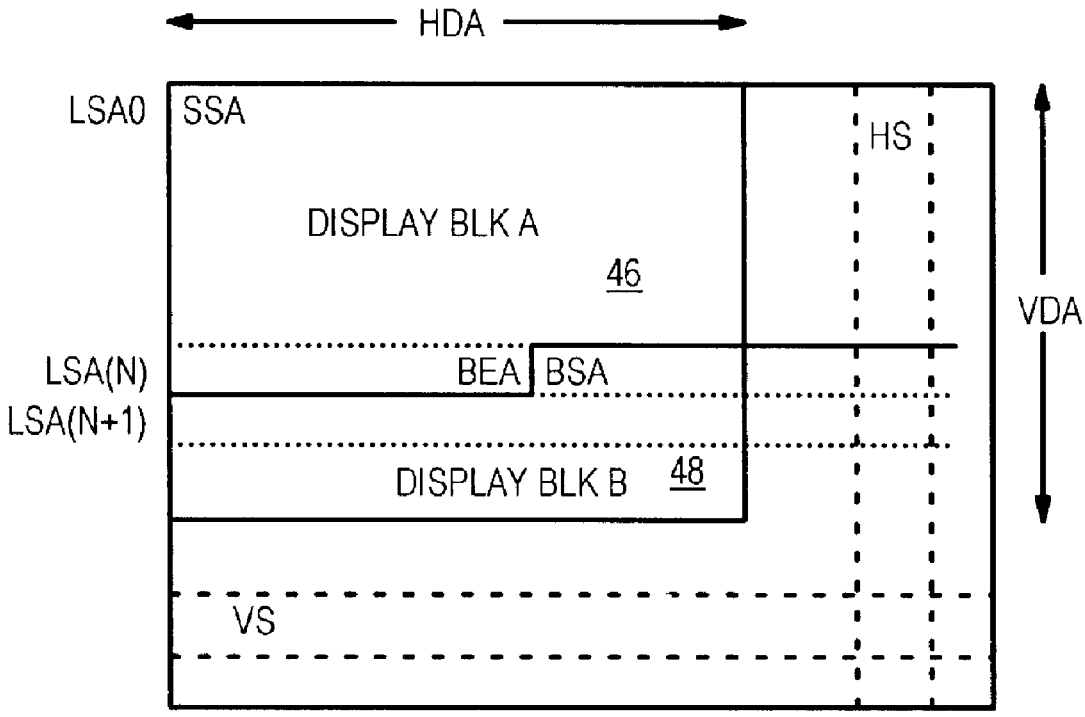
FIG. 6 is a display-timing diagram showing a block ending in the middle of a display line.

Block Ends in Middle of Display Line—FIG. 6

FIG. 6 is a display timing diagram showing a block ending in the middle of a display line. Just two physical blocks are shown for clarity, but more blocks could be used in an actual system. Pixels are written to the display from the upper left to the upper right in the first line (LSA0), and then for other lines from top to bottom.

The displayable area occurs for only a portion of the total frame time. Pixels are written to the display during the horizontal display active HDA time of a line, but not when HDA is off at the end of each line. The horizontal sync signal HS occurs when HDA is off at the ends of the lines.

Displayable lines of pixels are written to the display during the vertical display active VDA time, but not after the last line is written and VDA is turned off. Then the vertical sync VS signal occurs. Both the VS and HS signals are active near the end of the display frame timing.

The first physical block A, display block 46, begins with the screen starting address SSA at the beginning of line LSA0, and ends with BEA on line LSA(n). Block 46 ends in the middle of line LSA(n). Block-end signal BE is activated by the detector when the memory address counter matches the block-end address. Then the starting address of the next physical block is loaded into the line start register.

The first pixel in the second physical block B is read from the block start address BSA and written to the display to continue the current line LSA(n). Then other pixels in line LSA(n) in block 48 are written, and the next line LSA(n+1) in block 48 and subsequent lines are written.

Figure 7:
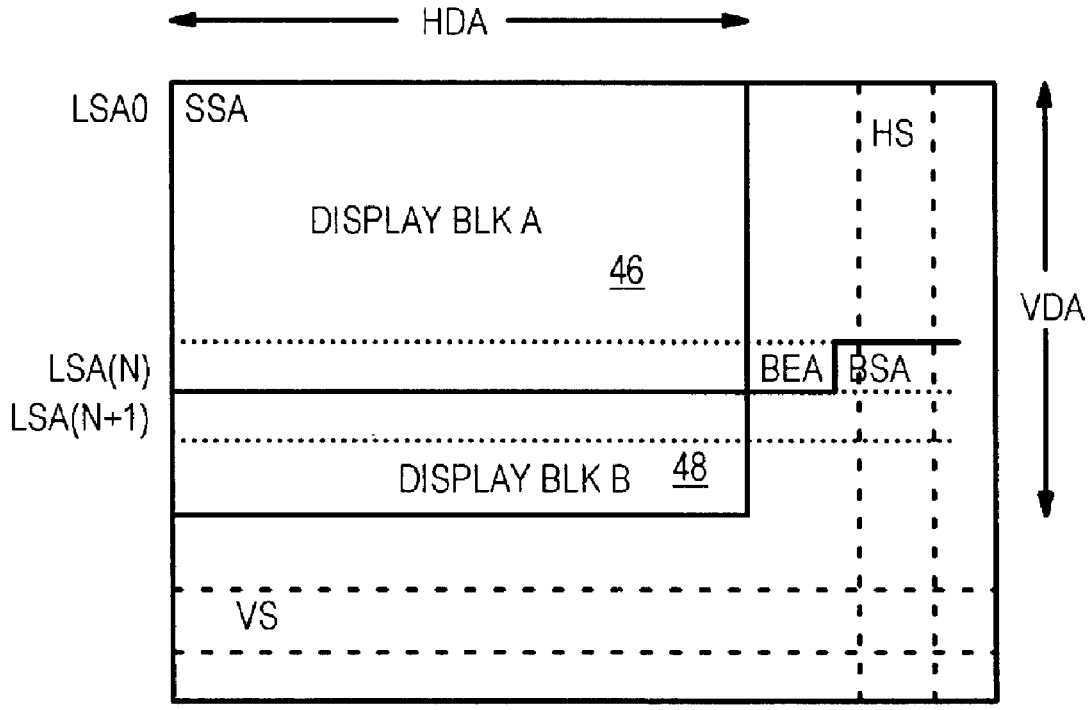
FIG. 7 is a display-timing diagram showing a block ending after the end of a display line in the off-screen area.

Block Ends after End of Display Line in Off-Screen Area—FIG. 7

FIG. 7 is a display timing diagram showing a block ending after the end of a display line in the off-screen area. The first physical block A, display block 46, begins with the screen starting address SSA at the beginning of line LSA0, and ends with BEA in the off-screen portion of line LSA(n). Block 46 ends in the off-screen portion of line LSA(n), after HDA ends. The memory address can skip from the end of line N to LSA (N+1). There might be no actual memory accesses to the address BEA and BSA.

Block-end signal BE is activated by the comparator when the next-line starting address generated by the adder exceeds the block-end address. Then the upper portion (U), bits m−12, of the next-line address generated by adder 70 is discarded. Instead, the upper portion (U) of the starting address of the next physical block is loaded into the line start register from start address selector 60. The lower part (L), bits 11−0, generated by adder 70 is loaded to memory address counter 66 through mux 62 and line start address register 64.

The first pixel in the second physical block B is read and written using the address value from memory address counter 66. It is the first displayable pixel in the next line LSA(n+1). Then other pixels in line LSA(n+1) in block 48 are written, and subsequent lines are written.

Figure 8A:
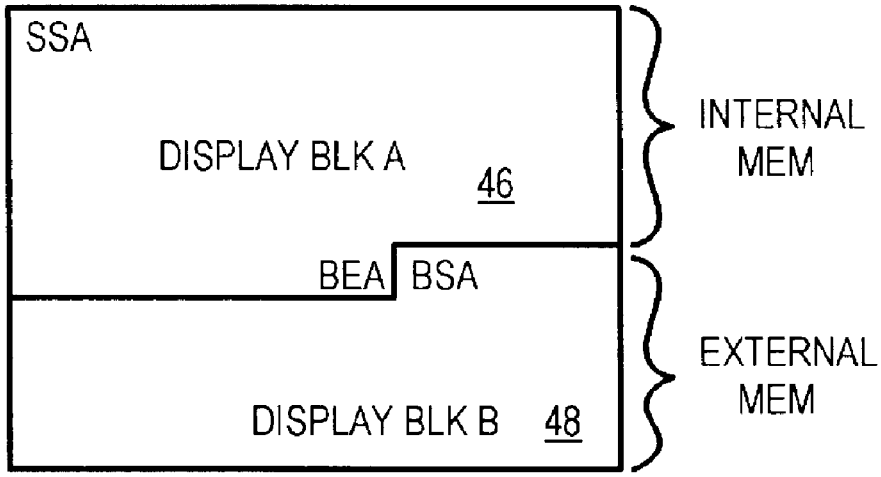
FIG. 8A shows a display that is refreshed with pixels from the on-chip SRAM and from the external SDRAM.

Full-Power Mode Fetches Pixels from Both On-Chip and External Memories—FIG. 8A FIG. 8A shows a display that is refreshed with pixels from the on-chip SRAM and from the external SDRAM. The first physical block A begins with the screen start address SSA and is a block in the on-chip SRAM. These memory accesses require less power since no off-chip signals are driven. Access times can be faster. First block 46 continues until the block end address BEA.

The second block B of the frame buffer begins at block start address BSA. Second block 48 continues to the end of the displayable area in this simplified example. This second block 48 is stored in external SDRAM, which requires more power to access than the on-chip SRAM since external lines with larger capacitances have to be driven. Also, the access time may be slower for the external SDRAM than for the internal SRAM.

During display of a frame, power consumption of the graphics functions in the SOC chip is lower during first block 46 than for second block 48 and any subsequent blocks from external SDRAM.

Figure 8B:
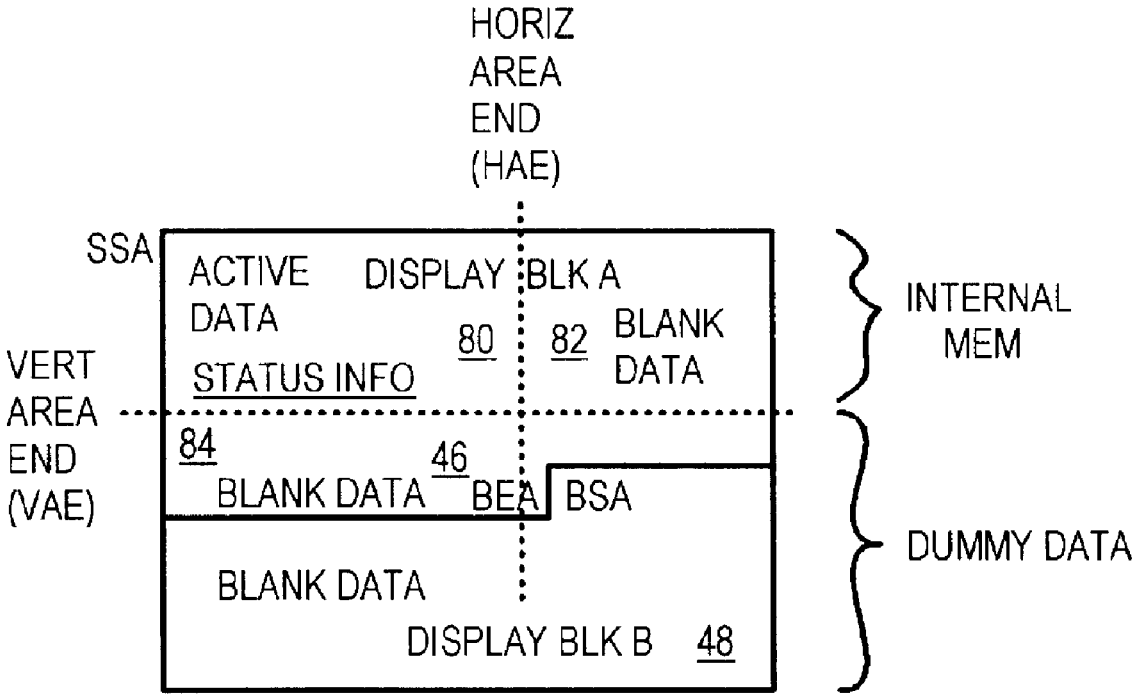
FIG. 8B shows a reduced-size display mode that is refreshed with pixels from the on-chip SRAM.

Low-Power Mode Fetches Pixels only from On-Chip Memory—FIG. 8B

FIG. 8B shows a reduced-size display mode that is refreshed with pixels from the on-chip SRAM. The first physical block A begins with the screen start address SSA and is a block in the on-chip SRAM. First block 46 continues until the block end address BEA. The second block B of the frame buffer begins at block start address BSA and continues to the end of the full display. This second block 48 is stored in external SDRAM, which requires more power to access than the on-chip SRAM since external lines with larger capacitances have to be driven.

To save power, the size of the display is reduced to a display window that is a fraction of the normal display. Additional counters and comparators count the number of pixels in the current line, and the line number. When the number of pixels in the current line matches or exceeds the horizontal-active-end HAE value, memory fetching ends for the line. Instead, dummy pixel data is written to the display. The dummy pixels could all be black or gray or some other pre-determined color. These dummy pixels form blank data 82 that is displayed after HAE. Active data 80 contains pixels that are fetched from the on-chip SRAM.

When the current line matches or exceeds the vertical-active end (VAE), memory fetching for the frame ends. Dummy pixels are written to the display, forming blank data 84.

The values for HAE and VAE are set so that the display window of active data 80 falls completely within first block 46, before BEA. Only dummy pixel data occurs in the second block 48, and no pixel-fetches of the external memory are required.

During display of a frame in a stand-by or other low-power mode using only the display window, power consumption of the graphics functions in the SOC chip is lower since only pixels from first block 46 are fetched. No fetches occur for second block 48, so power-hungry fetches from external SDRAM are eliminated.

Active data 80 in the smaller display window can contain status information for the hand-held device, or a smaller amount of information than is available for the full-power mode when the entire display is written. The hand-held device can switch to the standby or low-power display mode when the battery is low, or when little activity is occurring. The device can switch to the higher or full-power mode when the user is actively operating the device and needs more information displayed.

ALTERNATE EMBODIMENTS

Several other embodiments are contemplated by the inventors. For example the address generator of FIG. 5 could be implemented in logic gates and registers, or programmably implemented, or some combination of dedicated hardware and firmware. Other kinds of address translation could be substituted, or paging could be implemented in a variety of ways.

The entire page (all offset address locations within a page) does not have to be used by displayable pixels. Some overhead storage locations may be located on the page, and the last page on a frame can have only some of the available space used. A typical system has many more pages than shown in the drawings. For example, a frame buffer that stores 1 M-byte of pixels uses about 256 physical pages when each page is 4K in length.

The physical address of the memory may be specified in units other than bytes. For example, the physical memory may be read in words of 4 or 8 bytes. The memory address counter can be made to increment by one memory word every other pixel clock, to fetch several pixels at a time. Memory address counter 66 could count downward rather than upward to read blocks from top to bottom.

Some systems may not use vertical and horizontal sync signals, or other timing signals described, or may substitute other signals. Flat-panel and LCD displays may not require sync signals, or may use other signals. However, the invention can be modified to use these substitute signals, or dummy sync signals can be generated. The pixel clock may be stopped while the memory address counter is loaded, or pixel buffering or fast address loading may allow the pixel clock to continue uninterrupted.

The hand-held device can switch to a lower-power mode by changing the color resolution of the display. For example, the display can be switched from a 2 byte per pixel mode to a 2-bit per pixel mode to reduce the frame buffer size and reduce memory fetches. The number of pixels per line, and the numbers of lines per frame may also be changed to reduce power. When the frame buffer size falls below the size of the on-chip SRAM, then a refresh fetches are to the lower-power on-chip memory. Even when some external memory is needed, reducing the overall frame-buffer size reduces the number of external fetches needed and thus reduces power.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

[1. A multi-block display-refresh controller comprising:

a start address selector for selecting a block starting address from a plurality of block starting addresses and a screen starting address, the start address selector being loaded with a series of block starting addresses for a plurality of blocks within a display frame;

a selector, coupled to the start address selector, for selecting either the block starting address or a next-line address for output;

a line start register, coupled to receive an output of the selector, for storing a line starting address for a horizontal line of pixels in the display frame;

a memory address counter that is loaded with the line starting address from the line start register and incremented by a pixel clock as pixels in the horizontal line are written to a display;

an adder, receiving the line starting address from the line start register, for adding a line width to the line starting address to generate the next-line address to the selector;

a block-end detector, coupled to receive a pixel address from the memory address counter, for detecting a block end when the pixel address matches a block-end address for a current one of the plurality of blocks within the display frame; and wherein the selector selects a new block starting address from the start address selector when the block-end detector detects the block end, but the selector selects the next-line address from the adder when the block end is not detected by the block-end detector, whereby new block starting address are used when block ends are detected as the plurality of blocks of pixels are displayed within a display frame.]

[2. The multi-block display-refresh controller of claim 1 wherein when the block end is detected the line start register is loaded from the selector and the memory address counter is loaded from the line start register using a new block starting address from the start address selector, whereby pixel addresses are re-loaded when the block end is detected.]

[3. The multi-block display-refresh controller of claim 2 wherein the block end can occur in a middle of a horizontal line of pixels, wherein pixels from two blocks are displayed on a same horizontal line, wherein the two blocks are in non-adjacent memory locations separated by other data.]

[4. The multi-block display-refresh controller of claim 3 wherein the block end can also occur at an end of the horizontal line;

further comprising:

a comparator, receiving the next-line address from the adder, for comparing the next-line address to the block-end address and signaling the block end when the next-line address exceeds the block-end address.]

[5. The multi-block display-refresh controller of claim 4 wherein the start address selector is repeatedly over-written with a new block starting address as the series of blocks of pixels in the display frame are read;

wherein the block-end address is stored in a block-end register that is repeatedly over-written with a new block-end address for the block that had a block starting address in the start address selector.]

[6. A portable system comprising:

execute means for executing programs that write pixels for display to a single-block frame buffer;

frame-buffer-address translate means, receiving addresses of pixels from the execute means, for translating the addresses of pixels to memory addresses in a plurality of physical memory blocks;

low-power memory means for storing some of the plurality of physical memory blocks that store pixels;

high-power-memory access means for reading pixels stored in others of the plurality of physical memory blocks that are stored in an external memory;

wherein accesses of pixels stored in the external memory consume more power than accesses of pixels stored in the low-power memory means; and display controller means for writing pixels to a display, the display controller means reading pixels stored in the plurality of physical memory blocks including reading pixels stored in the low-power memory means and pixels stored in the external memory;

wherein the display controller means further comprises:

pixel counter means, having a pixel address that is incremented in response to a pixel clock as pixels are read from the lower-power memory means or from the external memory;

block-end register means for storing a block-end address of a current block in the plurality of physical memory blocks;

block-start register means for storing a block-start address of the current block in the plurality of physical memory blocks;

block-end detect means for detecting a block end when the pixel address from the pixel counter means reaches the block-end address from the block-end register means;

select means for loading the pixel counter means with a next block-start address from the block-start register means when the block-end detect means detects the block end, line start register means, loaded by the select means with the next block-start address when the block end is detected, for storing a starting pixel address for a display line; and add means, receiving the starting pixel address from the line start register means, for adding a line-width of pixels to generate a next-line starting pixel address to be loaded into the line start register means at an end of the display line;

whereby pixels in the single-block frame buffer are stored in multiple physical blocks in both the low-power memory means and in the external memory and whereby the pixel counter means is re-loaded with the next block-start address when the block end is detected.]

[7. The portable system of claim 6 wherein the low-power memory means is a memory on a same substrate as the execute means and the display controller means, but the external memory is on a separate substrate.]

[8. The portable system of claim 6 wherein the display controller means can enter a low-power mode wherein pixels are fetched only from the low-power memory means but not from the external memory, the display controller means can also enter a high-power mode wherein pixels are fetched from both the low-power memory means and from the external memory;

wherein the high-power mode consumes more power that the low-power mode.]

[9. The portable system of claim 6 further comprising:

window means, in the display controller means, for detecting when a current location for pixel fetching reaches a window limit, the window means preventing memory accesses to fetch pixels after the window limit is reached but instead supplying a fixed pixel for display, whereby fixed pixels rather than memory-fetched pixels are displayed once the window limit is reached.]

*10. An integrated circuit capable of being coupled, during use, to an external memory that is separate from the integrated circuit, the integrated circuit comprising:*

*a memory configured to store a first memory block of a frame buffer that comprises a plurality of memory blocks in a full power mode, wherein at least one of the other memory blocks of the plurality of memory blocks are stored in the external memory in the full power mode; and*

*a display controller coupled to the memory and configured to read pixels from the memory to be displayed on a display screen, and wherein, in a low power mode, the display controller is configured to display pixels read from the frame buffer on a reduced window of the display screen that excludes a portion of the display screen, and wherein the display controller is configured to read the displayed pixels for the reduced window only from the first memory block in the memory, and wherein the display controller is configured to display a fixed pixel not read from the memory or the external memory for the remaining pixels on the display screen outside of the reduced window, and wherein, in the full power mode, the display controller is configured to read pixels to be displayed from both the memory and the external memory.*

*11. The apparatus as recited in claim 10 wherein the display controller comprises a pixel counter configured to count a number of pixels from a current display line that have been displayed, and wherein the display controller is configured to fetch pixels from the memory for display until the counter reaches an end of the reduced window, and wherein the display controller is configured to display the fixed pixel for the remainder of the current display line.*

*12. The apparatus as recited in claim 11 wherein the remainder of the current display line is mapped to addresses in the memory, but the display controller is configured to display the fixed pixel responsive to the counter reaching the end of the reduced window.*

*13. The apparatus as recited in claim 12 wherein the display controller is configured to not fetch the pixels corresponding to the remainder of the current display line from the memory.*

*14. The apparatus as recited in claim 10 wherein the display controller comprises a line counter configured to indicate a line number of the current display line, and wherein the display controller is configured to display only the fixed pixel for remaining display lines when the line number reaches an end of the reduced window.*

*15. The apparatus as recited in claim 14 wherein pixels from one or more of the remaining display lines are mapped to addresses in the memory, but the display controller is configured to display the fixed pixel responsive to the counter reaching the end of the reduced window.*

*16. The apparatus as recited in claim 15 wherein the display controller is configured to not fetch the pixels corresponding to the remaining display lines from the memory.*

*17. A method comprising:*

*in a low power mode, displaying pixels read from a frame buffer on a reduced window of a display screen that excludes a portion of the display screen, wherein the displaying comprises:*

*reading the displayed pixels for the reduced window only from a first block in a memory included on a same integrated circuit as a display controller that performs the displaying; and*

*displaying a fixed pixel not read from the memory or the external memory for the remaining pixels on the display screen outside of the reduced window; and*

*in a full power mode, displaying pixels read from both the memory and an external memory coupled to the integrated circuit.*

*18. The method as recited in claim 17 further comprising, in the low power mode, displaying a different image on the reduced window than is displayed on a full window that includes the frame buffer data from the memory and from the external memory.*

*19. The method as recited in claim 18 wherein the different image comprises status data for a device that includes the integrated circuit.*

*20. The method as recited in claim 18 wherein the different image comprises a smaller amount of information than is displayed in a full power mode.*

*21. The method as recited in claim 17 further comprising:*

*detecting that pixels displayed from the current display line have reached an end of the reduced window;*

*ceasing fetching pixels from the memory for display responsive to the detecting; and*

*displaying the fixed pixel for the remainder of the current display line.*

*22. The method as recited in claim 21 wherein the remainder of the current display line is mapped to addresses in the memory, but the fixed pixel is displayed.*

*23. The method as recited in claim 17 further comprising:*

*detecting that the current display line is an end of the reduced window;*

*ceasing fetching pixels from the memory for display responsive to the detecting; and*

*displaying the fixed pixel for the remaining display lines.*

*24. The method as recited in claim 23 wherein pixels from one or more of the remaining display lines are mapped to addresses in the memory, but the fixed pixel is displayed.*

*25. A portable device comprising:*

*a display screen; and*

*an integrated circuit coupled to the display screen, wherein the integrated circuit comprises:*

*a memory configured to store a first memory block of a frame buffer that comprises a plurality of memory blocks in a full power mode, wherein at least one of the other memory blocks of the plurality of memory*

*blocks are stored in an external memory separate from the integrated circuit in the full power mode; and*

*a display controller coupled to the memory and configured to read pixels from the memory to be displayed on a display screen, and wherein, in a low power mode, the display controller is configured to display pixels read from the frame buffer on a reduced window of the display screen that excludes a portion of the display screen, and wherein the display controller is configured to read the displayed pixels for the reduced window only from the first memory block in the memory, and wherein the display controller is configured to display a fixed pixel not read from the memory or the external memory for the remaining pixels on the display screen outside of the reduced window, and wherein, in the full power mode, the display controller is configured to read pixels to be displayed from both the memory and the external memory.*

*26. The portable device as recited in claim 25 wherein the portable device is a portable communication device.*

*27. The portable device as recited in claim 25 wherein the portable device is a portable computing device.*

*28. The portable device as recited in claim 25 further comprising the external memory coupled to the integrated circuit.*

* * * * *

UNITED STATES PATENT AND TRADEMARK OFFICE

CERTIFICATE OF CORRECTION

PATENT NO. : RE43,235 E
APPLICATION NO. : 12/789856
DATED : March 13, 2012
INVENTOR(S) : Ishii et al.

It is certified that error appears in the above-identified patent and that said Letters Patent is hereby corrected as shown below:

In Column 8, Line 45, delete “lower-power” and insert -- low-power --, therefor.

In Column 10, Line 40, in Claim 6, delete “lower-power” and insert -- low-power --, therefor.

Signed and Sealed this
Thirtieth Day of October, 2012

David J. Kappos

David J. Kappos
*Director of the United States Patent and Trademark Office*